April 20, 1948.
A. H. HEINEMAN
2,439,806
TESTING CHAMBER
Filed Aug. 11, 1943
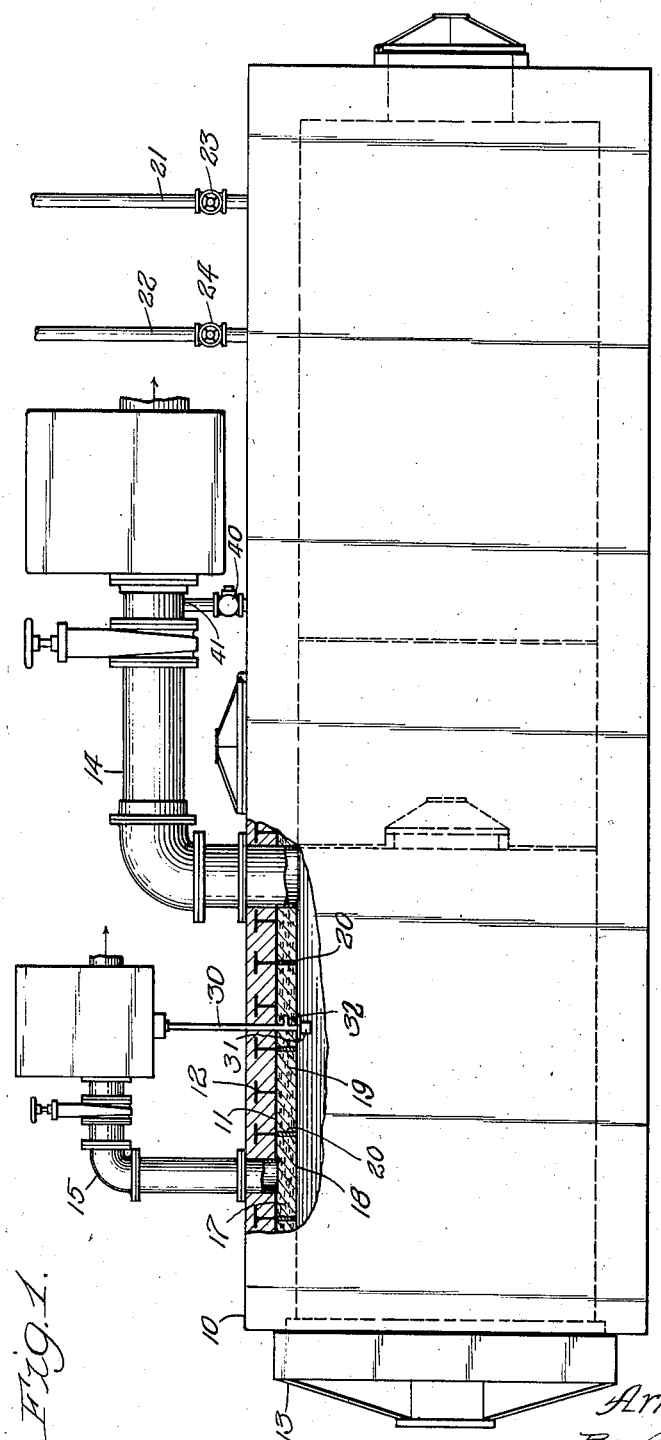
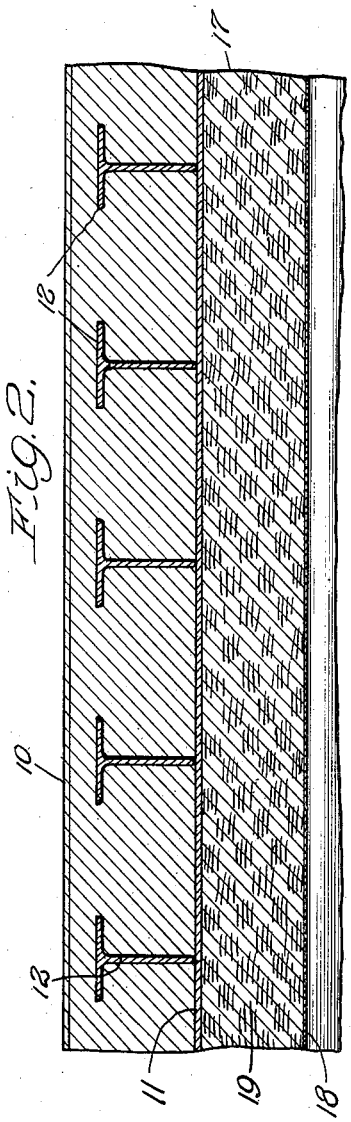
Inventor:
Arnold H. Heineman,
By Clinton, Miles, Davies,
Schroeder & Merriam, Attys.

Patented Apr. 20, 1948

2,439,806

UNITED STATES PATENT OFFICE 2,439,806

TESTING CHAMBER

Arnold H. Heineman, Chicago, Ill., assignor, by mesne assignments, to Guardite Corporation, Wilmington, Del., a corporation of Delaware Application August 11, 1943, Serial No. 498,146

4 Claims. (Cl. 73—1)

This invention relates to a testing chamber and more particularly to a chamber designed for high altitude testing for aviation equipment and personnel.

One of the recent developments in aviation training and testing has been the use of testing chambers within which changes in pressure, temperature and humidity can be made in order to simulate high altitude conditions, as well as all conditions between high altitude and normal ground level atmospheric conditions. In carrying out this work it is necessary to increase and decrease the humidity with great speed, to change the temperature rapidly, as well as to change the pressure. The chambers are usually made of mild steel. This type of steel will not withstand the low temperatures which are sometimes employed in the chambers, particularly below —50° F. It is, therefore, customary to insulate the interior of the chamber with an insulating material such as cork. In the normal changes which occur inside of the test chamber moisture is precipitated on the walls at times which destroys the insulating value of the insulation, and removal of the moisture from the insulation has proved difficult.

By means of the present invention, an insulated chamber is produced in which the insulation cannot become moistened by these changes and, therefore, retains its insulating value at all times. This is done by providing an airtight metallic membrane inside the insulation and then maintaining a lower pressure within the insulation than is maintained in the chamber itself.

The invention is illustrated in the drawings in which Figure 1 represents a diagrammatic elevation of a test chamber, partly in section; and Figure 2 represents an enlarged sectional view of a portion of the wall of the chamber.

As shown in the drawings, the chamber 10 has a mild steel wall 11 suitably braced as by beams 12, and provided with one or more doors 13. Suitable evacuation means 14 is provided for evacuating the chamber. In the drawing additional evacuation equipment 15 is shown connected to the intermediate chamber 17 formed by the thin metallic membrane 18 and the wall 11 of the chamber. The chamber 17 is shown as filled by an insulating material 19, preferably cork. At intervals suitable supporting means 20 may be provided which may consist of wooden stringers, but are not necessary when using an insulating material like cork. The evacuation equipment has been designated as pumps but it will be understood that these pumps may take any suitable form including air pumps, steam jets, or any combination thereof. The chamber may also be provided with an air inlet 21 and a steam inlet 22.

Under operating conditions the pressure within the chamber may be rapidly varied to meet test conditions. This variation may be carried out by any kind of control of the evacuation equipment 14. The raising of the pressure may be controlled by operation of the valve 23 on the air line 21, and the humidity may be affected by admission of steam from the line 22 as controlled by valve 24. Under operating conditions all of these controls will normally be automatic, but the type of control is no part of the present invention.

The evacuating equipment 15 connected to the insulation chamber 17 is shown as separate from the main evacuation equipment, but, if desired, one evacuator may be employed.

In operation there is normally a pressure below which the chamber will not be operated, say 2.5 to 3 inches mercury absolute. The pressure in the insulation chamber is, in accordance with this invention, normally kept at a point suitably below the normal minimum and is always kept below the actual pressure in the test chamber. A suitable pressure in the insulation chamber is 1.5 to 2 inches of mercury. In order that the pressure in the insulation chamber always be below the pressure in the test chamber, an automatic pressure regulator 30 of any suitable type, having pressure responsive means 31 in the test chamber and 32 in the insulation chamber, is employed, to regulate the evacuation equipment 15. The pressure regulating equipment, which is available on the market and the specific structure of which is no part of this invention, is set automatically to regulate the pressure in the insulation chamber so that a suitable differential is maintained at all times. Thus if the pressure in the insulation chamber should rise for any reason to the extent that the predetermined differential between that pressure and the pressure in the test chamber does not exist, the evacuation equipment 15 automatically is started and the proper differential restored. As already pointed out, a differential of 1 to 1.5 inches of mercury is usually satisfactory.

In operation it is not necessary to raise the pressure within the insulation chamber beyond its normal setting when the pressure in the remainder of the chamber rises. The membrane 18 is supported against outward pressure by the cork without deformation. Since the pressure within the insulation chamber is not permitted to rise above that in the test chamber, no inward deformation of the membrane can occur.

It is of course possible to operate the system with no pressure differential or even with a very slight positive pressure differential between the test chamber and the insulation chamber. Any attempt to operate in that manner, however, may cause local disturbance which will result in destruction or serious deformation of the membrane 18.

The membrane 18 may be made of any suitable airtight material. Inasmuch as it does not have to be thick enough to withstand the pressure differentials to which the wall 11 is subjected, the membrane may, if desired, economically be made of special steels which are not affected by the low temperatures created within the chamber.

In practice the pressure in the insulation chamber may be maintained at a sufficiently low point by connecting the insulation chamber through an automatically operated check valve 40 to the main evacuating equipment as at 41. In this way the insulation chamber will be evacuated whenever pressure in the main evacuation line falls below the pressure in the insulation chamber. This check valve is preferably not of the ordinary spring operated type, but preferably includes independent means, not shown, for opening and closing the valve whenever pressure in the exhaust line falls below that in the insulating chamber. Such independent means is preferred to avoid the usual leakage occurring at a check valve.

The foregoing detailed description has been given for clearness of understanding only, and no unnecessary limitations should be understood therefrom.

What I claim as new, and desire to secure by Letters Patent, is:

1. In a pressure chamber, a pressure shell, a layer of insulating material inside the shell, an airtight membrane inside the insulation dividing the pressure chamber into an insulation chamber and a testing chamber, means for evacuating the testing chamber and the insulation chamber to an absolute pressure near zero and for maintaining pressure in the insulation chamber at subatmospheric pressure not substantially greater than the pressure in the testing chamber, the pressure shell being of metal which substantially loses strength at the temperatures normally encountered in the testing chamber, and the membrane being of metal which does not substantially lose its strength at said temperatures.

2. In a pressure chamber, a pressure shell, a layer of solid insulation immediately inside the shell, an airtight membrane lining the inside of the insulation and forming a main testing chamber and an insulation chamber, means for evacuating the main chamber and the insulation chamber to an absolute pressure near zero and for maintaining pressure in the insulation chamber at all times below the pressure in the testing chamber, the pressure shell being of metal which substantially loses strength at the temperatures normally encountered in the testing chamber, and the membrane being of metal which does not substantially lose its strength at said temperatures.

3. A pressure chamber as set forth in claim 2 in which means are provided in the insulating material for supporting the membrane against pressure.

4. A pressure chamber as set forth in claim 2 in which the means for evacuating the testing chamber and the insulation chamber includes an evacuation line common to both, the opening of the testing chamber and the insulation chamber to the evacuation system being in series, and the opening from the insulation chamber being downstream with respect to the opening from the testing chamber.

ARNOLD H. HEINEMAN.

REFERENCES CITED

The following references are of record in the file of this patent:

UNITED STATES PATENTS

| Number | Name | Date |
|---|---|---|
| 1,787,101 | Bramwell | Dec. 30, 1930 |
| 2,000,882 | Comstock | May 7, 1935 |
| 2,026,079 | White et al. | Dec. 31, 1935 |
| 2,329,765 | Jackson et al. | Sept. 21, 1943 |

FOREIGN PATENTS

| Number | Country | Date |
|---|---|---|
| 389,535 | Great Britain | Mar. 23, 1933 |
| 497,685 | Great Britain | Dec. 23, 1938 |